(12) United States Patent
Lasslo et al.

(10) Patent No.: US 10,730,732 B1
(45) Date of Patent: Aug. 4, 2020

(54) PIPE-HOISTING STRAP INSTALLATION TOOL

(71) Applicants: Stephen John Paul Lasslo, De Pere, WI (US); Tom James Lasslo, Price, UT (US); Jeremiah John Garcia, Price, UT (US)

(72) Inventors: Stephen John Paul Lasslo, De Pere, WI (US); Tom James Lasslo, Price, UT (US); Jeremiah John Garcia, Price, UT (US)

( * ) Notice: Subject to any disclaimer, the term of this patent is extended or adjusted under 35 U.S.C. 154(b) by 446 days.

(21) Appl. No.: 15/232,703

(22) Filed: Aug. 9, 2016

Related U.S. Application Data

(60) Provisional application No. 62/207,202, filed on Aug. 19, 2015.

(51) Int. Cl.
*B66F 19/00* (2006.01)
*B25B 27/14* (2006.01)
*B66C 1/18* (2006.01)
*F16L 41/06* (2006.01)
*F16L 55/18* (2006.01)

(52) U.S. Cl.
CPC .............. *B66F 19/00* (2013.01); *B25B 27/14* (2013.01); *F16L 41/06* (2013.01); *F16L 55/18* (2013.01); *B66C 1/18* (2013.01)

(58) Field of Classification Search
CPC .. B66F 19/00; B66C 1/18; F16L 41/04; F16L 41/06; F16L 55/17; F16L 55/178; F16L 55/1705; B25B 27/14
USPC ................ 29/244, 243.53, 243.55, 278, 271; 285/197; 248/62, 74.3; 137/15.12, 15.13
See application file for complete search history.

(56) References Cited

U.S. PATENT DOCUMENTS

| | | | | |
|---|---|---|---|---|
| 2,163,261 A | * | 6/1939 | Norton ..................... | F16L 1/06 138/97 |
| 3,178,793 A | * | 4/1965 | Rosengarten, Jr. ... | F16L 55/178 425/13 |
| 3,265,782 A | * | 8/1966 | Rosengarten, Jr. ... | F16L 55/178 264/32 |
| 4,004,539 A | * | 1/1977 | Wesson ................... | B63B 21/54 114/221 R |
| 4,043,139 A | * | 8/1977 | Scott ......................... | F16L 1/06 405/184.4 |
| 4,190,182 A | * | 2/1980 | Hickey ..................... | A45F 5/10 224/917 |

(Continued)

*Primary Examiner* — Orlando E Aviles
*Assistant Examiner* — Seahee Yoon
(74) *Attorney, Agent, or Firm* — Brian C. Trask

(57) ABSTRACT

A device operable, by a user standing above the grade of a pipe, to install a hoisting strap around the pipe. A device body carries wheels and has an opening structured for installation onto the pipe at a mid-span location. The opening is reversably enlarged during installation of the device to permit entrance of the pipe into partially encircled engagement by the body. Typically, three or more wheels are biased by the body into rolling engagement on the pipe at the installed position. Once installed, the device captures an end of the hoisting strap, and carries the strap end under the pipe as the device is rotated about the pipe centerline. The strap end can then be removed from the device to sling the pipe in a conventional lifting arrangement. The device can be removed from the pipe by pulling the device to again expand the opening.

20 Claims, 10 Drawing Sheets

(56) References Cited

U.S. PATENT DOCUMENTS

| | | | | |
|---|---|---|---|---|
| 4,610,439 A | * | 9/1986 | Burghardt | B25B 9/04 |
| | | | | 138/99 |
| 4,793,578 A | * | 12/1988 | Howard | F16L 3/222 |
| | | | | 248/62 |
| D358,979 S | * | 6/1995 | Reid | D8/354 |
| 5,794,896 A | * | 8/1998 | Hungerford, Jr. | F16L 3/12 |
| | | | | 248/74.3 |
| 6,142,165 A | * | 11/2000 | Wartel | F16L 41/06 |
| | | | | 137/15.08 |
| 6,224,025 B1 | * | 5/2001 | Alvarez | F16L 3/11 |
| | | | | 24/339 |
| 7,018,137 B2 | * | 3/2006 | Hutton | F16L 41/06 |
| | | | | 285/197 |
| 7,025,308 B1 | * | 4/2006 | Hill | F16L 3/133 |
| | | | | 138/107 |
| 7,252,459 B2 | * | 8/2007 | Bideault | F16L 41/06 |
| | | | | 405/184.1 |
| 7,325,559 B2 | * | 2/2008 | Darut | F16L 41/06 |
| | | | | 137/15.12 |
| 7,832,420 B2 | * | 11/2010 | Hoskisson | F16L 41/06 |
| | | | | 137/318 |
| 2012/0003072 A1 | * | 1/2012 | Laurini | B25J 15/0028 |
| | | | | 414/746.7 |
| 2016/0047509 A1 | * | 2/2016 | Long | F16L 55/18 |
| | | | | 138/99 |

* cited by examiner

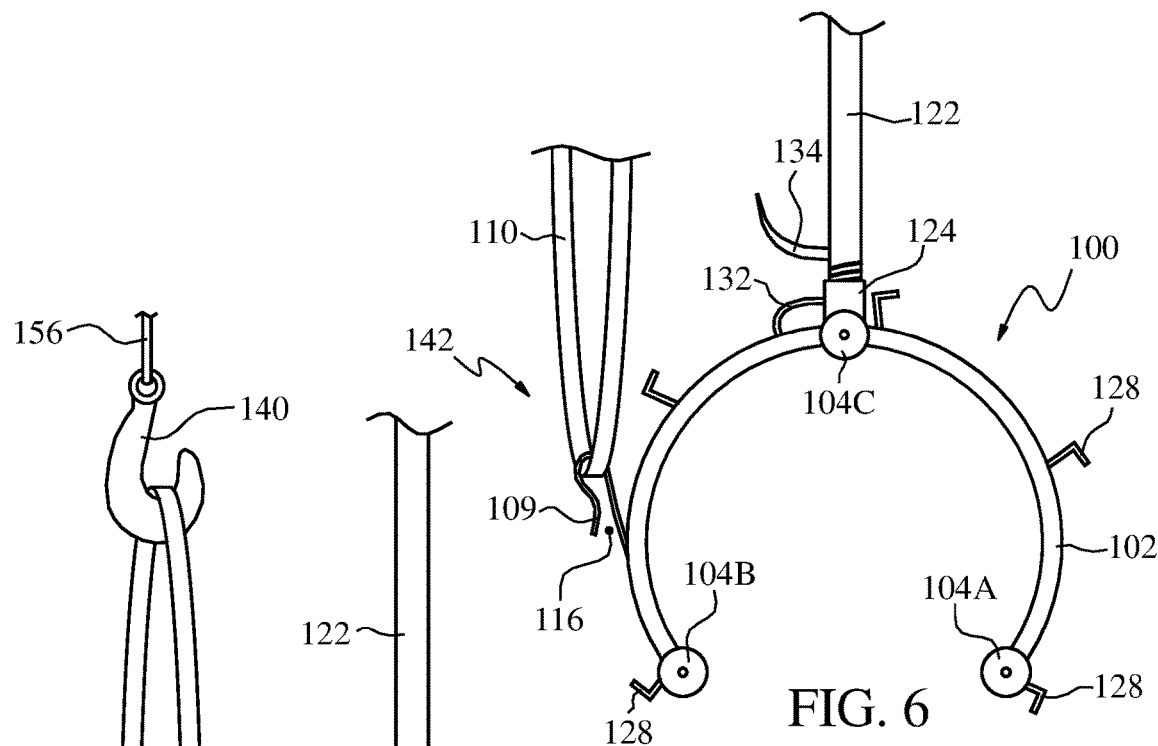
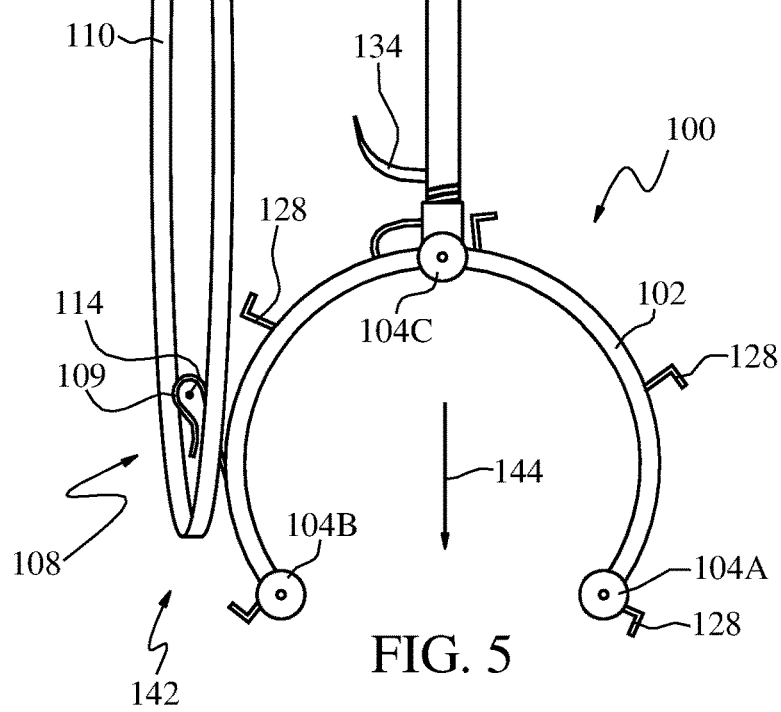
FIG. 6
FIG. 5

PIPE-HOISTING STRAP INSTALLATION TOOL

RELATED APPLICATIONS

This application claims the benefit under 35 U.S.C. 119(e) of the filing date of Provisional Application Ser. No. 62/207,202, filed Aug. 19, 2015, for "PIPE SAFETY DEVICE".

BACKGROUND

Field of the Invention

This invention relates to industrial equipment and safety devices. It is particularly directed to devices and methods for installing a hoisting strap onto a pipe that is disposed below grade in a trench.

State of the Art

The trench that a pipeline is placed within is often several feet deep and the segments of pipe along a pipeline are often several feet below the grade of the surrounding ground. When the pipe is placed within the trench it is typically laid within the trench upon areas of support (e.g., pads of dirt or spray foam). These areas of support hold the pipe above the deepest portion of the trench and provide intermittent sections of space below the pipe. There are generally six (6) inches, or so, of clearance below the pipe at multiple intervals along the length of the pipe once it is placed within the trench. These areas of clearance below the pipe permit transfer of a strap underneath the pipe from one side of the pipe to the other side.

Periodically, a segment of pipe along a pipeline may need to be moved to allow for realignment, repositioning, or repair. In order to accomplish this, the pipe must be moved using a cable, line, lifting strap, or other type of known harness, an end of which is passed under the pipe. For purpose of this disclosure, the term "hoisting strap" is intended to encompass all of such pipe-lifting arrangements. The hoisting strap is then conventionally attached to a crane or other heavy machinery, which can then be used to lift the pipe and move it into the desired position.

The existing method of transferring a hoisting strap underneath a pipe that is within a ditch or trench involves a worker going down into the trench and reaching under the pipe to pass the hoisting strap from one side to the other side of the pipe. This existing method can be both time-consuming and unsafe. For example, walls of the trench may collapse on the worker when the worker is in a most vulnerable position. There exists a need for a method to transfer a hoisting strap underneath a pipeline from one side to the other that is both safe and expedient.

BRIEF SUMMARY OF THE INVENTION

An embodiment of the invention includes a body that carries a connector structured to couple with one end of a hoisting strap. A workable body is structured for transverse installation, in a radially inward direction with respect to a pipe centerline, onto a pipe to an installed position in registration with the pipe at a location spaced apart from either end of the pipe. "Transverse installation" basically encompasses any way to associate a body with a pipe that avoids sliding the body along the pipe from a pipe end. At the installed position, the body is capable of rotation about the pipe centerline. Desirably, at the installed position, the body is coupled to the pipe to resist radial displacement between the body and the pipe while permitting circumferential relative motion between the pipe and the body.

A body typically carries torque structure operable as rotation anchors or elements that may be pushed-on, or pulled-on, described in more detail below. In a preferred embodiment, the body is biased by assembly of the body onto a pipe effective to clamp a plurality of rolling elements radially onto the external surface of the pipe.

The body carries at least one connector operable to couple with a loop portion of a hoisting strap, the connector being operable to drag the loop portion in a circumferential direction in correspondence with displacement of the body in a circumferential direction around a portion of the pipe. One workable connector is structured as a hook that includes a capture mouth and a holding pen, the capture mouth having an enlarged distally directed opening structured to facilitate engaging with the loop portion of a hoisting strap. The connector may be structured to develop a bias to resist undesired escape of the loop portion from the holding pen. In an exemplary embodiment, the connector is structured such that tension applied to the hoisting strap to displace the loop portion in an entrance direction to the holding pen is operable to open the capture mouth sufficiently to permit entrance of the loop portion into the holding pen. Also, the connector may be structured such that tension applied to the hoisting strap in an exit direction is operable to open the capture mouth sufficiently to permit release of the loop portion from the holding pen.

Embodiments are typically used with an installation device structured to removably couple with the body effective to permit a user to displace the body in a radially inward direction (with respect to a pipe centerline) to an installed position on the pipe. Embodiments are also typically used with a rotator device structured to impart rotation of the body around the pipe centerline. Preferably, the installation device is operable as the rotator device.

One workable rotator device has a length sufficient to permit operation by a user standing at an elevated position or grade with respect to the pipe. The aforementioned rotation anchors each may provide an interface against which the rotator device may engage effective to impart rotation to the body about the pipe centerline. Sometimes, a rotation anchor is structured to receive a force imparted by placing the rotator device in compression. In other cases, or even additionally, a rotation anchor is structured to receive a force imparted by placing the rotator device in tension.

It is within contemplation that a rotator device may encompass a remote drive mechanism, such as one or more powered drive wheel carried by, or otherwise associated with, a body. An operable remote drive wheel may be actuated by an electric motor, or other driving element effective to urge the body in a circumferential direction around the pipe. Such a motor is desirably battery operated. A battery or other source of power may be carried on the body, or coupled to the body by a length of an electrical conductor. Operation of the strap-installing device may be effected wirelessly, or tethered to an operator by a communication cable, for examples.

Embodiments are typically used with a removal device structured to engage with an extraction anchor carried by the body. A workable removal device is operable to pull the body in a radially outward direction (with respect to the pipe centerline) to remove the body from the pipe. Preferably, the installation device is also operable as the removal device. It is also desirable for an installation device to be operable to remove a captured loop portion of a hoisting strap from captured engagement with the connector.

In an exemplary embodiment, the body forms a substantial C-shape. The C-shape carries structure including a first wheel disposed at one end of the 'C', and a second wheel disposed at the other end of the 'C'. Typically, the body carries a third wheel disposed between the first and second wheels, the first, second, and third wheels being biased by the body into contact with the pipe when the body in installed in registration on the pipe. At installed and uninstalled locations, a closest distance between the first wheel and the second wheel is less than the diameter of the pipe on which the embodiment is intended to be installed. In preferred embodiments, the first and second wheels are arranged such that, during installation of the body onto the pipe, the first and second wheels engage spaced-apart portions of the pipe such that further transverse displacement of the body in the radially inward direction with respect to the centerline of the pipe effectively pries open the C-shaped body to accommodate travel of the pipe in the transverse direction through an expanded 'C' opening.

Sometimes, the body is structured to permit a user to make a change in body size effective to fit the body in installed registration on different pipes having a plurality of different diameters. Further, a workable body may encompass more complicated mechanisms than illustrated in this document. Hinged mechanisms, sliding mechanisms, or other mechanized, electronic, magnetic, and other alternative ways to associate a body by way of transverse installation on a pipe, are also contemplated as being within the scope of this invention.

Embodiments may be used in a method for wrapping a hoisting strap around a pipe. One such method includes the steps of: providing an apparatus structured as indicated immediately above; coupling the installation device to the body; using the installation device to displace the body transversely toward the centerline of the pipe at a location spaced apart from either end of the pipe until the body is seated in installed registration on the pipe; lowering a loop of hoisting strap to locate a loop portion of the hoisting strap in registration with a connector that is carried by the body; applying tension to the hoisting strap to couple the loop portion with the connector; removing the installation device from the body; using the installation device to push or pull on rotation anchors carried by the body and thereby to apply a rotation displacement to the body operably to wrap part of the hoisting strap around the pipe; using the installation device to extract the loop portion from the connector such that the hoisting strap extends downwardly on one side of the pipe, under the pipe, and upwardly on the other side of the pipe; coupling the installation device to the body; and using the installation device to pull the body transversely from engagement with the pipe.

BRIEF DESCRIPTION OF THE DRAWINGS

In the drawings, which illustrate what are currently considered to be the best modes for carrying out the invention:

FIGS. 5 through 18 illustrate operation of the embodiment in FIG. 4.

DETAILED DESCRIPTION OF THE ILLUSTRATED EMBODIMENTS

Reference will now be made to the drawings in which the various elements of the illustrated embodiments will be given numerical designations and in which the invention will be discussed so as to enable one skilled in the art to make and use the invention. It is to be understood that the following description is only exemplary of certain principles of the present invention, and should not be viewed as narrowing the claims which follow.

Figure 1:
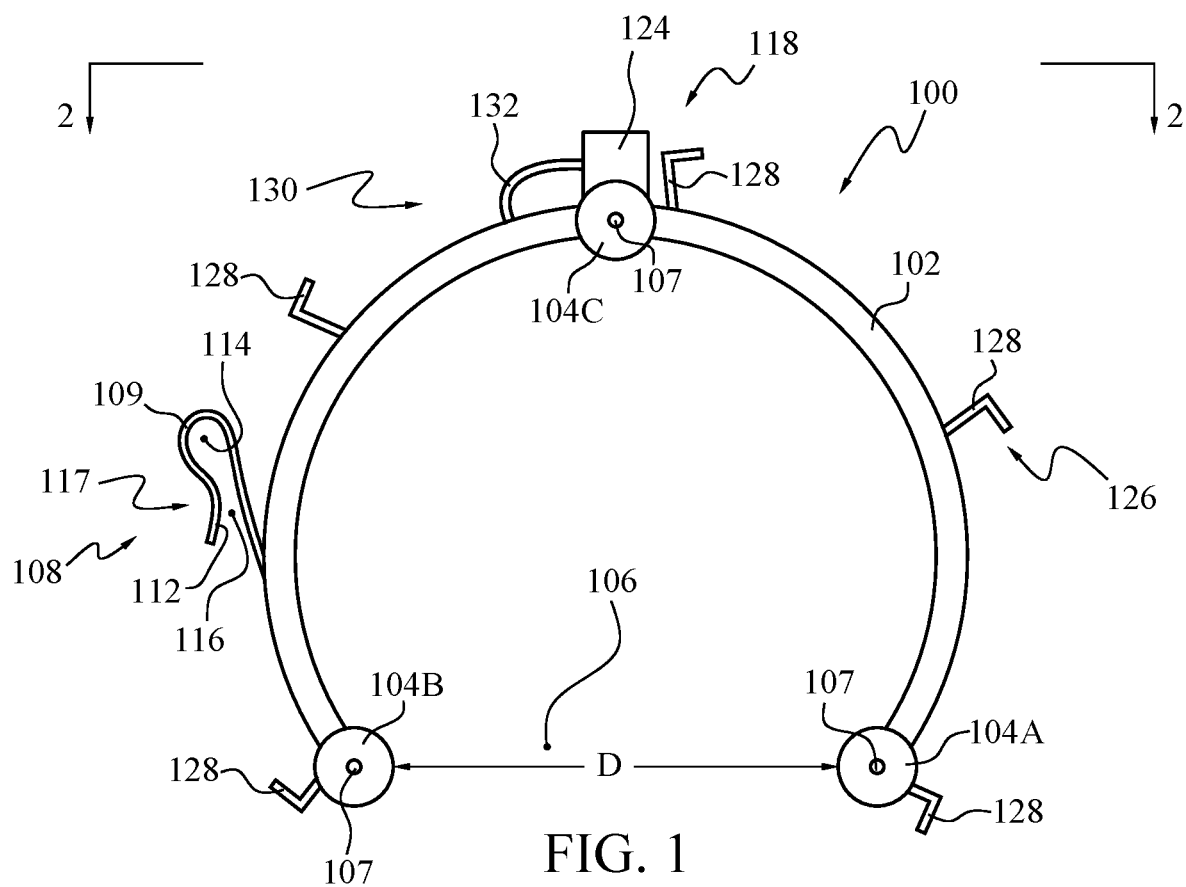
FIG. 1 is an end view in elevation of a portion of a preferred embodiment.

A portion of a first preferred embodiment, generally indicated at 100, is illustrated in FIG. 1. The embodiment 100 includes a generally C-shaped body 102 that carries a plurality of rolling elements, such as wheels, generally 104. Wheels 104 are illustrated as being transparent, although that is not required. A body 102 is typically elastic such that body 102 can be deformed sufficiently to permit installation of device 100 onto, and removal off from, a pipe. A workable body 102 may be formed from, e.g., metal, plastic, fiberglass and other composite materials, and the like. It is currently contemplated to injection mold a body 102 from high density polyethylene (HDPE).

With continued reference to FIG. 1, a first wheel 104A is carried at one end of the C-shaped body 102, and a second wheel 104B is carried at the other end of the body 102. Wheels 104A and 104B are spaced apart, at a closest distance D, by less than the diameter of a pipe on which the device 100 is to be installed. A variable-size opening 106 is located between wheels 104A and 104b. A third wheel 104C is typically disposed at or near a mid-span portion of body 102. Desirably, wheels 104A-C make 3-point circumferentially rolling contact on the pipe subsequent to installation of device 100 on the pipe.

Figure 2:
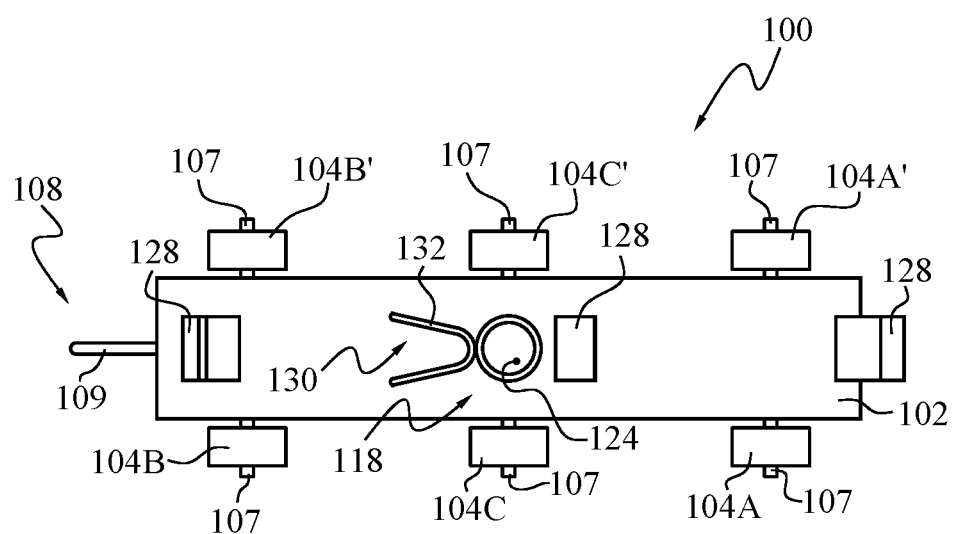
FIG. 2 is a top view of the embodiment in FIG. 1, as indicated by section 2-2 and looking in the direction of the arrows.

With reference to FIG. 2, it can be seen that wheels 104 in the preferred embodiment 100 may include paired wheel sets, such as 104A and 104A'; 104B and 104B', etc., which are entrained in a conventional manner for rotation on axle structure 107. Such paired wheel sets provide stability to the installed device 100 and facilitate rotation of the installed device 100 about a pipe's centerline. Desirably, the body 102 is biased at an installed position to clasp the pipe between a plurality of wheels 104. At the installed position, the body 102 is typically coupled to the pipe to resist radial displacement between the body 102 and the pipe while permitting circumferential relative motion between the pipe and the body 102.

With particular reference to FIG. 1, body 102 also carries at least one connector, generally indicated at 108, operable to couple with, or capture, a portion of a hoisting strap 110 (see also FIG. 5). A workable connector 108 includes structure, such as a hook 109, operable to drag the captured portion of a hoisting strap 110 in a circumferential direction in correspondence with displacement of the installed body 102 in a circumferential direction around a portion of the pipe. One workable hook 109 includes a capture mouth 112 and a holding pen 114.

As illustrated in FIG. 1, a capture mouth 112 may include an enlarged distally directed flared opening 116 structured to facilitate engaging with a loop portion of a hoisting strap. A constriction, generally indicated at 117, is disposed in capture mouth 112 between the flared opening 116 and the holding pen 114. The connector 108 may be structured to develop a bias to resist undesired escape of the loop portion from the holding pen 114. In an illustrated embodiment 100, the connector 108 is structured such that tension applied to the hoisting strap to displace the loop portion in an entrance direction to the holding pen 114 is operable to open the constriction 117 of capture mouth 112 sufficiently to permit entrance of the loop portion into the holding pen 114. Also, the connector 108 is desirably structured such that tension applied to the hoisting strap in an exit direction is operable to open the constriction 117 of capture mouth 112 sufficiently to permit release of the loop portion from the holding pen 114.

Figures 3, 4:
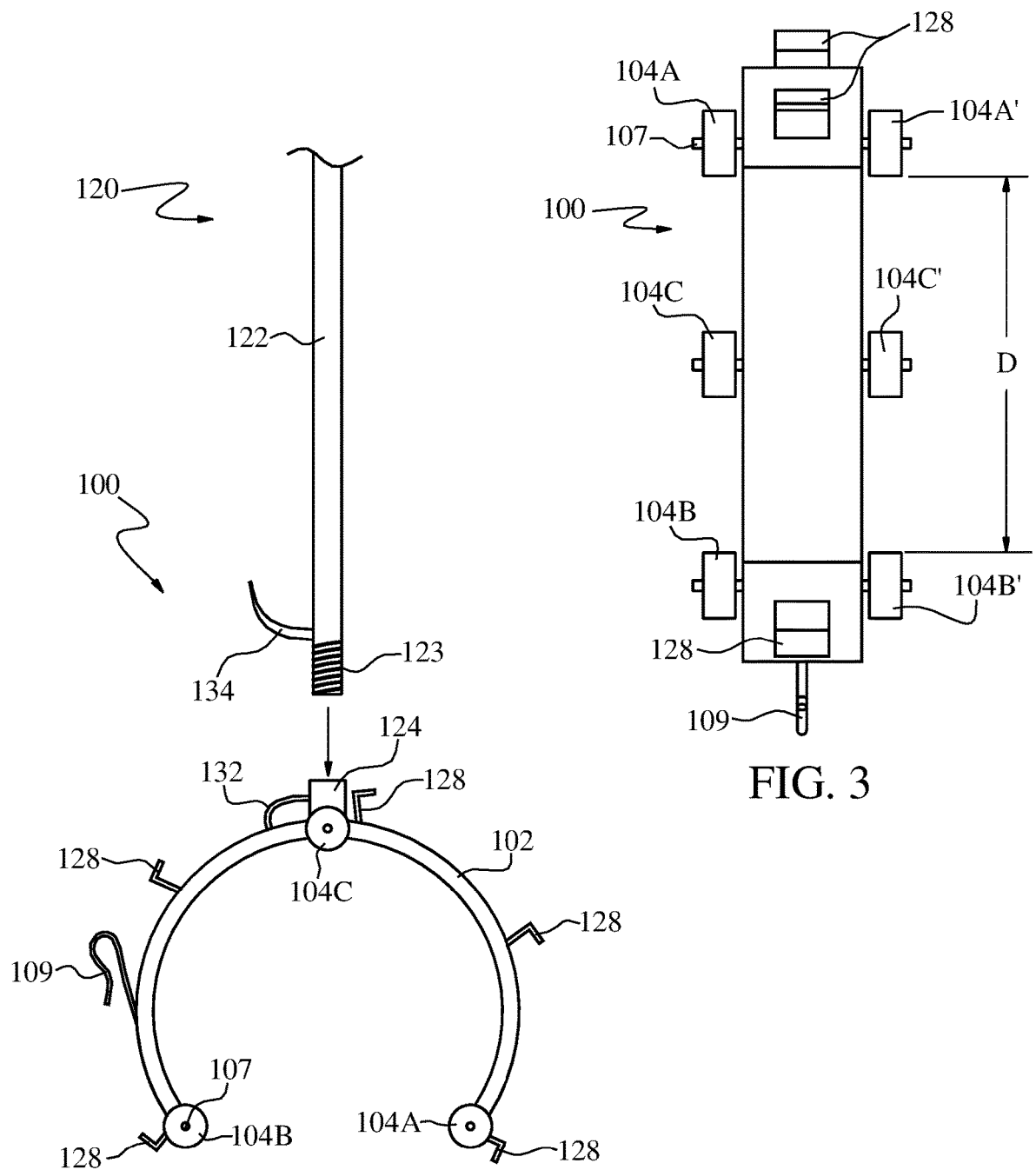
FIG. 3 is a bottom view of the embodiment in FIG. 1.
FIG. 4 is an end view in elevation of a portion of a preferred embodiment.

Still with reference to FIG. 1, body 102 carries coupling structure, generally indicated at 118, operable to removably couple with an installation device. An installation device, generally 120, is illustrated in FIG. 4. An installation device is operable to orient a body 102 with respect to a pipe centerline for installation of the body 102 onto the pipe. The installation device desirably permits installation of the body 102 onto a pipe while a user is disposed at a position remote from the pipe. One workable installation device 120 includes a pole or rod 122 capable of applying a force to a body 102 in a radial direction with respect to the centerline of a pipe. A workable pole 122 is somewhat similar to a broom or shovel handle, and may be made from wood, metal, plastic, fiberglass or other composite material, and the like. Workable coupling structure 118 is operable to transfer a compression force from an installation device 120 to urge the body 102 in a radial direction and into seated engagement on a pipe. One such coupling structure 118 includes a threaded end 123 of pole 122 and a cooperating threaded socket 124.

Figures 7, 8:
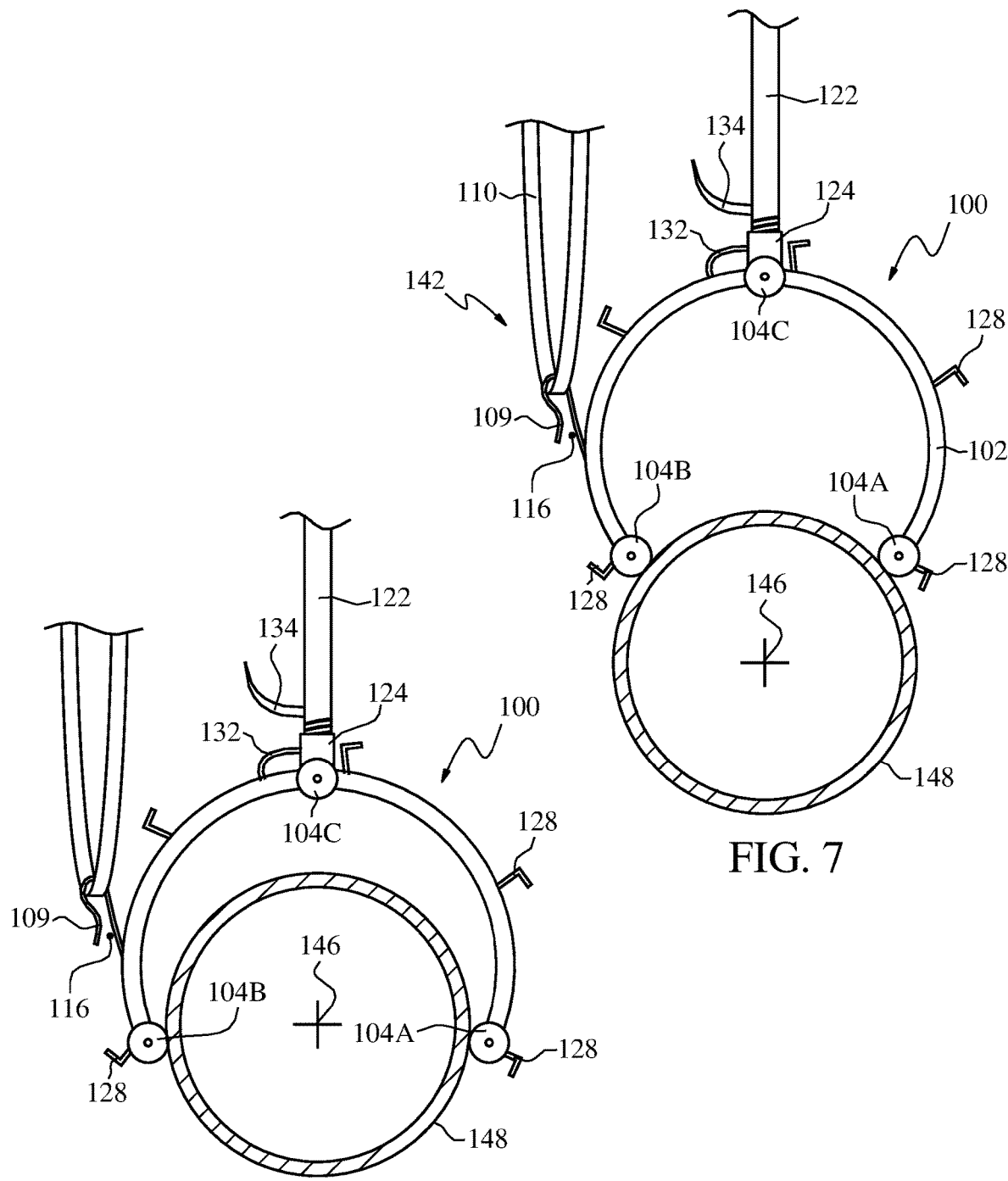
Figure 9:
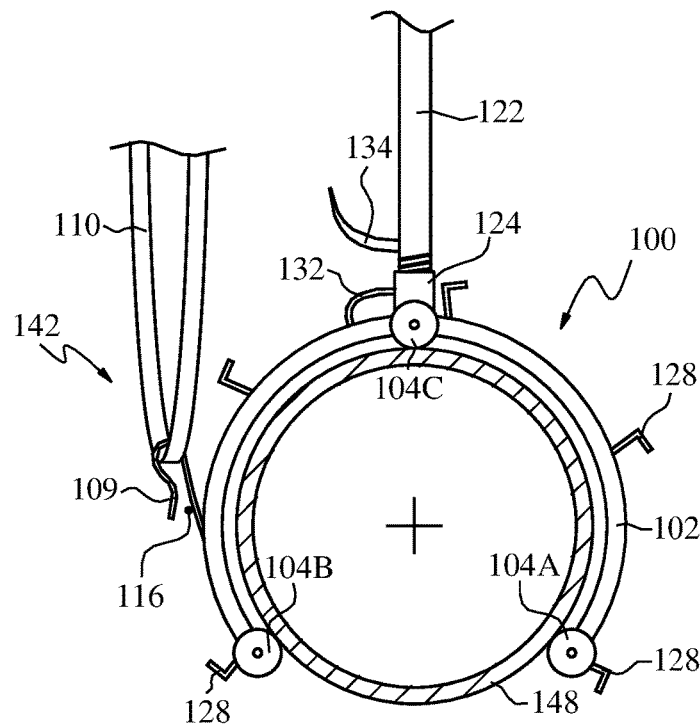

During installation of device 100 on a pipe, the wheels 104A and 104B are placed in contact with a pipe, and can operate to pry apart the opening 106 as the device 100 is displaced radially inwardly toward the pipe centerline (see FIGS. 7-9). An alternative embodiment may be placed around a pipe, and subsequently spring-biased, or otherwise actuated, to hold the device in the installed position. That is, an alternative opening 106 may initially be larger than a pipe diameter, and can be reduced in size after the alternative body is located in registration for rotation about the pipe centerline.

With reference still to FIG. 1, torque structure, generally 126, is carried by body 102. Torque structure 126 is operable to apply a force to the body, which results in a torque about the centerline of a pipe, effective to cause rotation of the body 102 about the centerline. Exemplary torque structure 126 includes a plurality of push plates or anchors 128 that cooperate with a rotator device. A rotator device operates to impart a force on the body 102 to urge displacement of the body 102 in a circumferential direction about a pipe centerline. A rotator device may interface directly with the body 102 or apply that force on a push plate 128 or other suitable anchor or brace element carried by a body 102. Desirably, the installation device 120 is structured to also operate as a rotator device. For example, an end of pole 122 (FIG. 4) can be used to press on a push plate 128 while a user is disposed at a location remote from the pipe and body 102.

A push plate 128 is an exemplary brace element against which an end of a rotator device may press to apply a compression force from the rotator device to the body 102. Sometimes, a push plate, or other structure, may configured to permit a rotator device to impart a tension force onto the body 102. Exemplary alternative push plate structure may be formed as socket-like elements or detents in body 102. A plurality of push plate elements permit sequential engagement of different plates 128 and a rotator device as the body 102 rotates about the pipe centerline.

Continuing to refer to FIG. 1, body 102 also carries extraction structure, generally 130, operable to remove body 102 from an installed position on a pipe. Exemplary extraction structure 130 includes loop bracket 132 and hook 134 on rod 122 (FIG. 4). The hook 134 may engage with the bracket 132 to pull the body 102 in a radially outward direction from the pipe. Alternative extraction structure 130 may include coupling structure 118. In that alternative embodiment, threaded end 123 can be engaged in cooperating socket 124, and rod 122 can be used to pull body 102 transversely from an installed position on a pipe.

With reference now to FIGS. 5 and 6, installation rod 122 may be coupled to body 102 in preparation for attachment of a hoisting strap 110. Rod 122 may stabilize body 102 while an end loop portion, generally 142, of hoisting strap 110 is engaged in connector 108. The other end of strap 110 may be held by a crane hook 140, or by hand. Desirably, a flared opening 116 is provided to facilitate capture of end portion 142 in a holding pen 114 of a connector 108. It is further desirable that connector 108 develops a bias to resist undesired decoupling of the loop portion 142 from capture within the holding pen 114.

Figure 10:
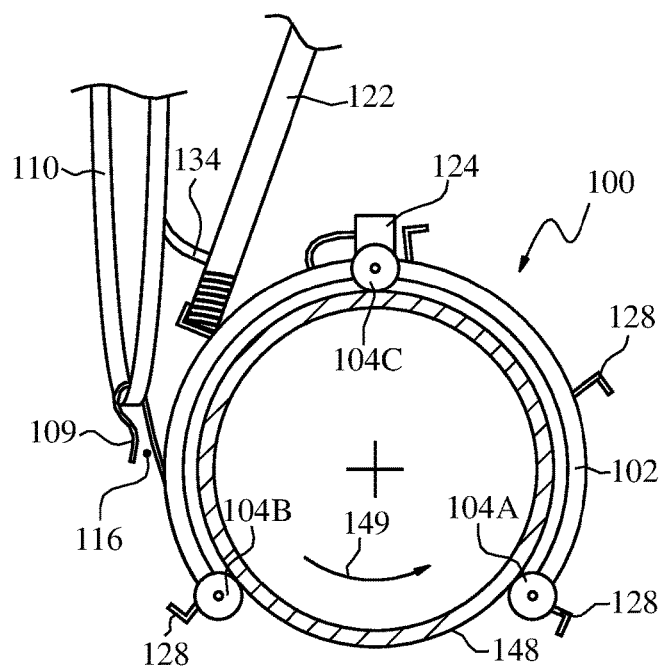
Figure 11:
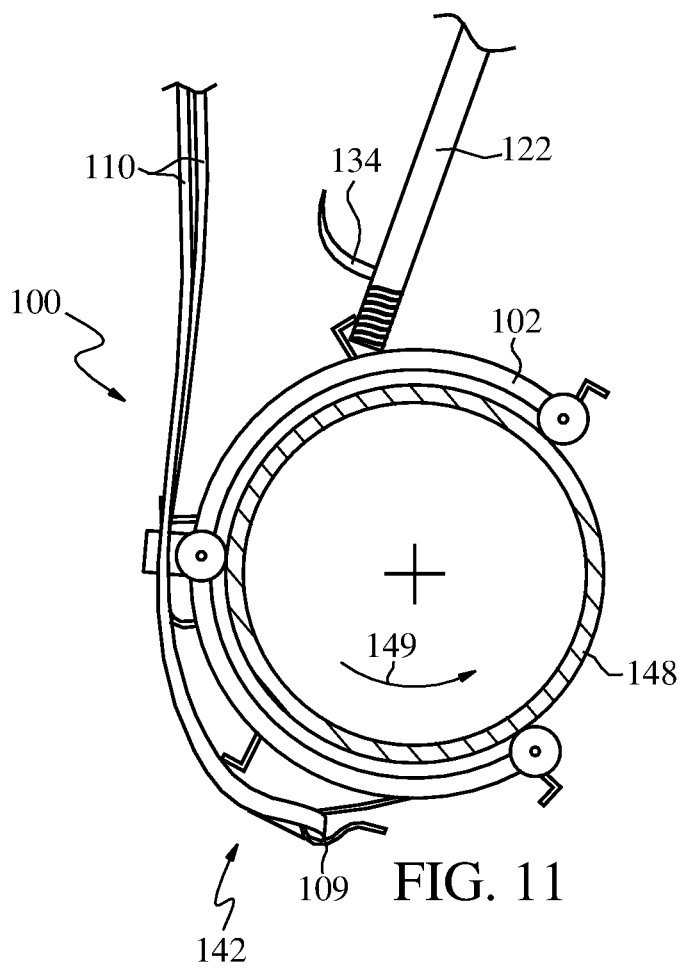
Figure 12:
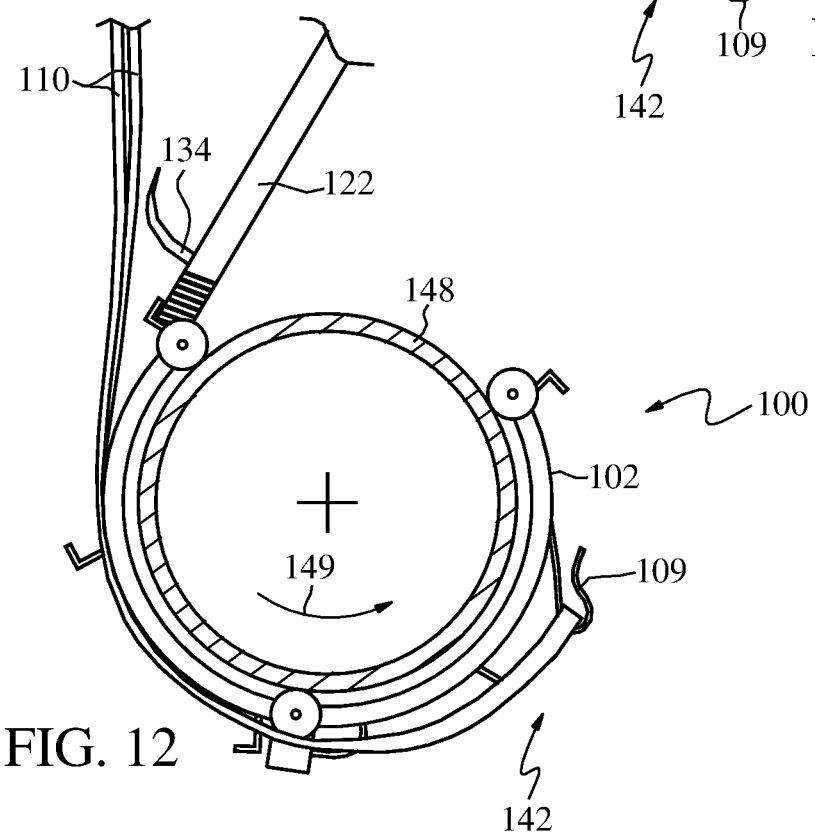
Figure 13:
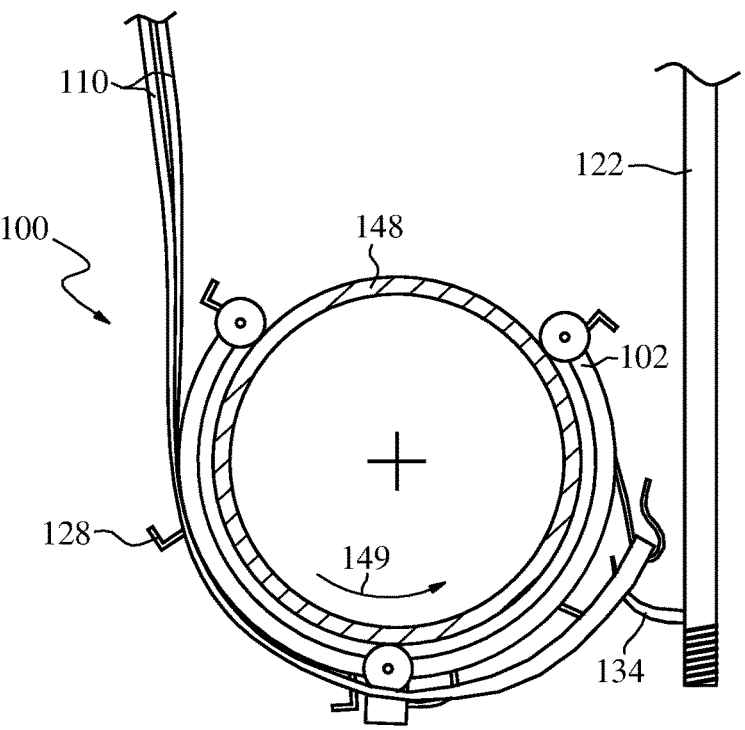
Figure 14:
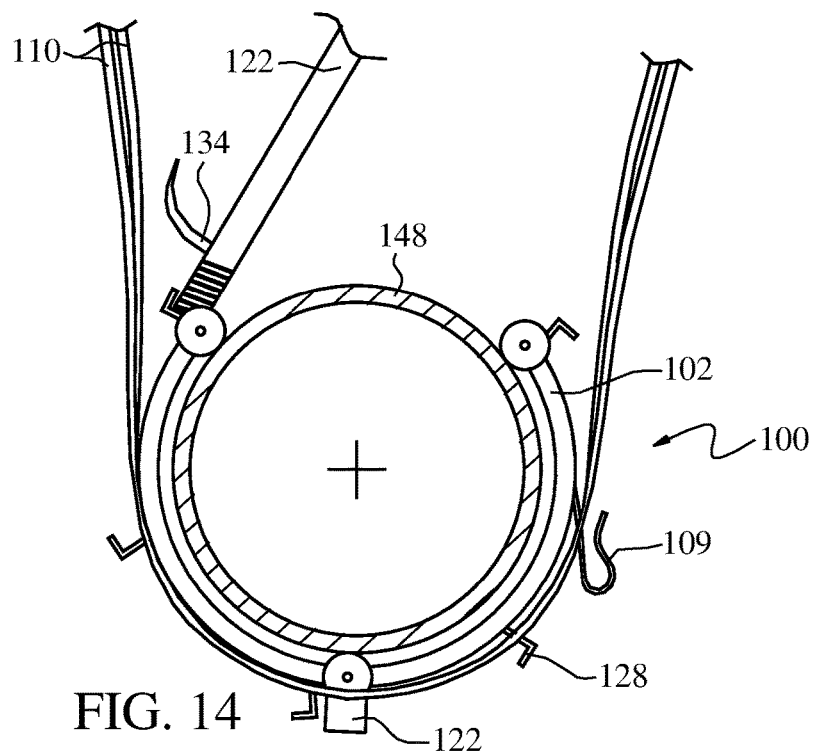
Figure 15:
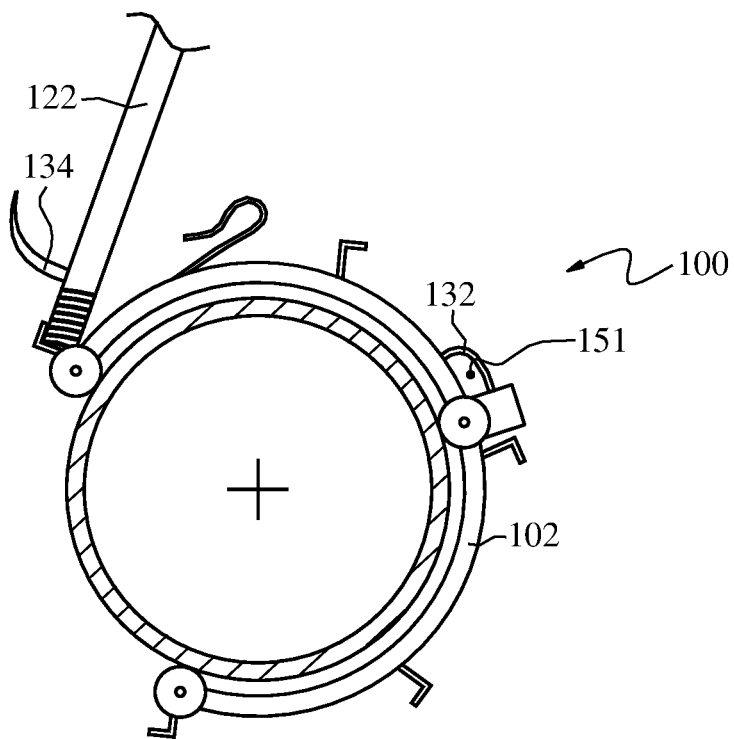
Figure 16:
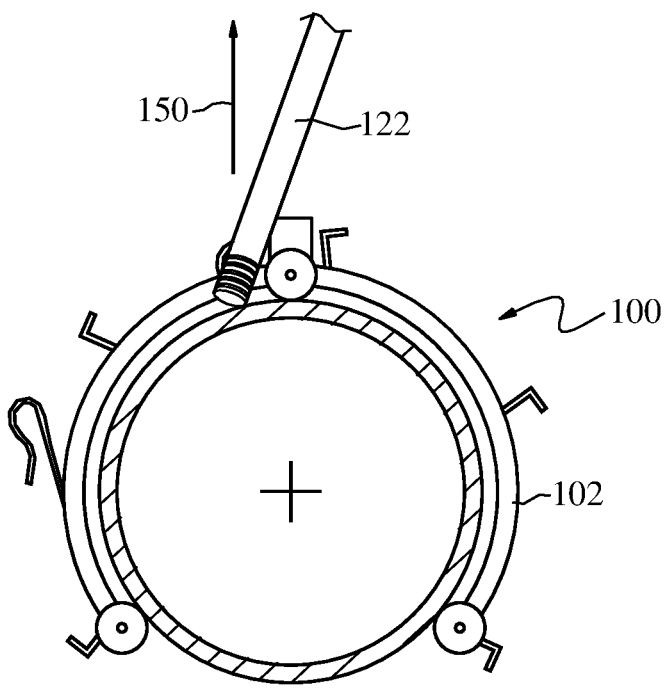
Figure 17:
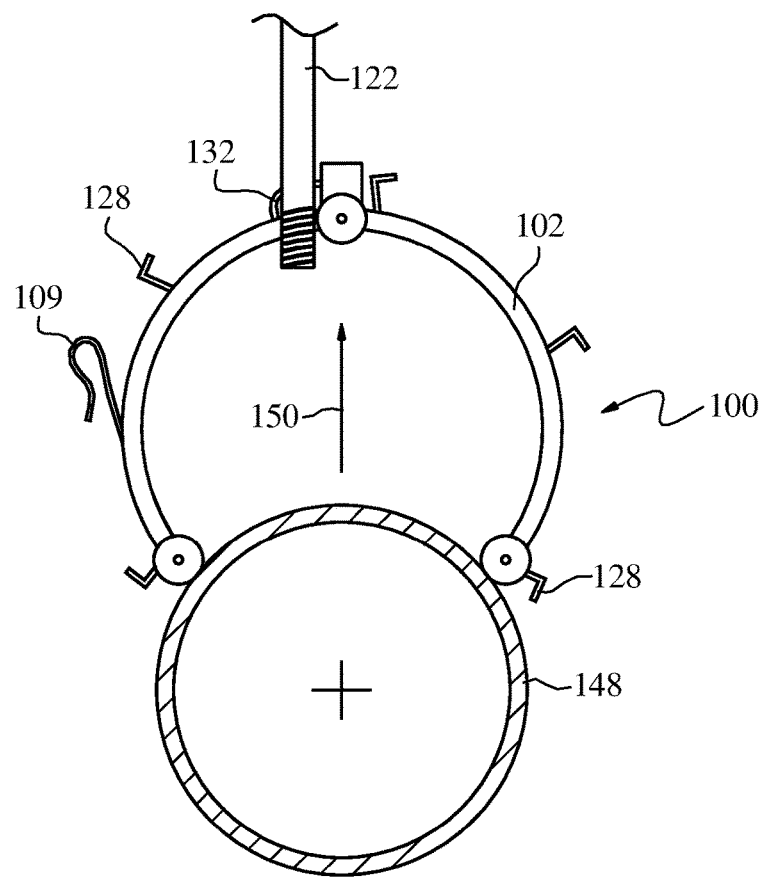
Figure 18:
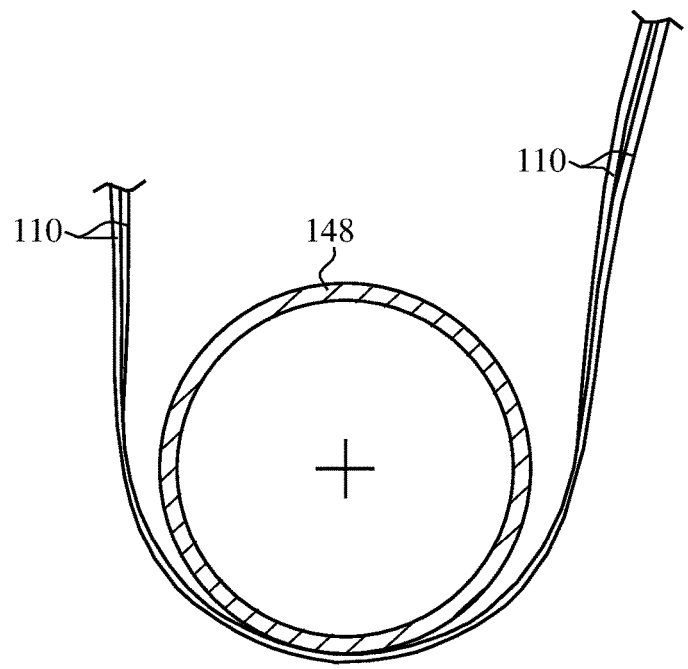

FIG. 7 illustrates rod 122 being used to displace body 102 in a radially inward direction 144 toward the centerline 146 of pipe 148. In FIG. 8, wheels 104A and 104B are displaced by rolling along the pipe 148 to enlarge opening 106 (FIG. 1) and permit transverse passage of the pipe 148 for reception of pipe 148 in body 102. FIG. 9 illustrates the body 102 seated in registration on pipe 148 prior to decoupling rod 122. FIG. 10 illustrates beginning the rotation of body 102 in a circumferential direction 149 by use of decoupled rod 122 to push on a push plate 128. In FIG. 12, the hoisting strap 110 is in position for retrieval, e.g. by hook 134 of rod 122, which is illustrated in FIGS. 13 and 14. FIGS. 14 and 15 illustrate using rod 122 to further rotate body 102 in preparation for removal of body 102 from attachment to pipe 148. FIG. 16 illustrates coupling hook 134 and loop bracket 132 in preparation to remove body 102 from pipe 148 in the radially outward direction 150. The hook 134 may be inserted into an aperture 151 formed by bracket 132 (see also FIG. 15). Then, the pole 122 may be used as a lever to help pry the body 102 from engagement on the pipe 148. FIG. 17 illustrates removal of body 102 from pipe 148 in the radially outward direction 150. FIG. 18 illustrates hoisting strap 110 ready to sling pipe 148 in any conventional lifting arrangement.

Figure 19:
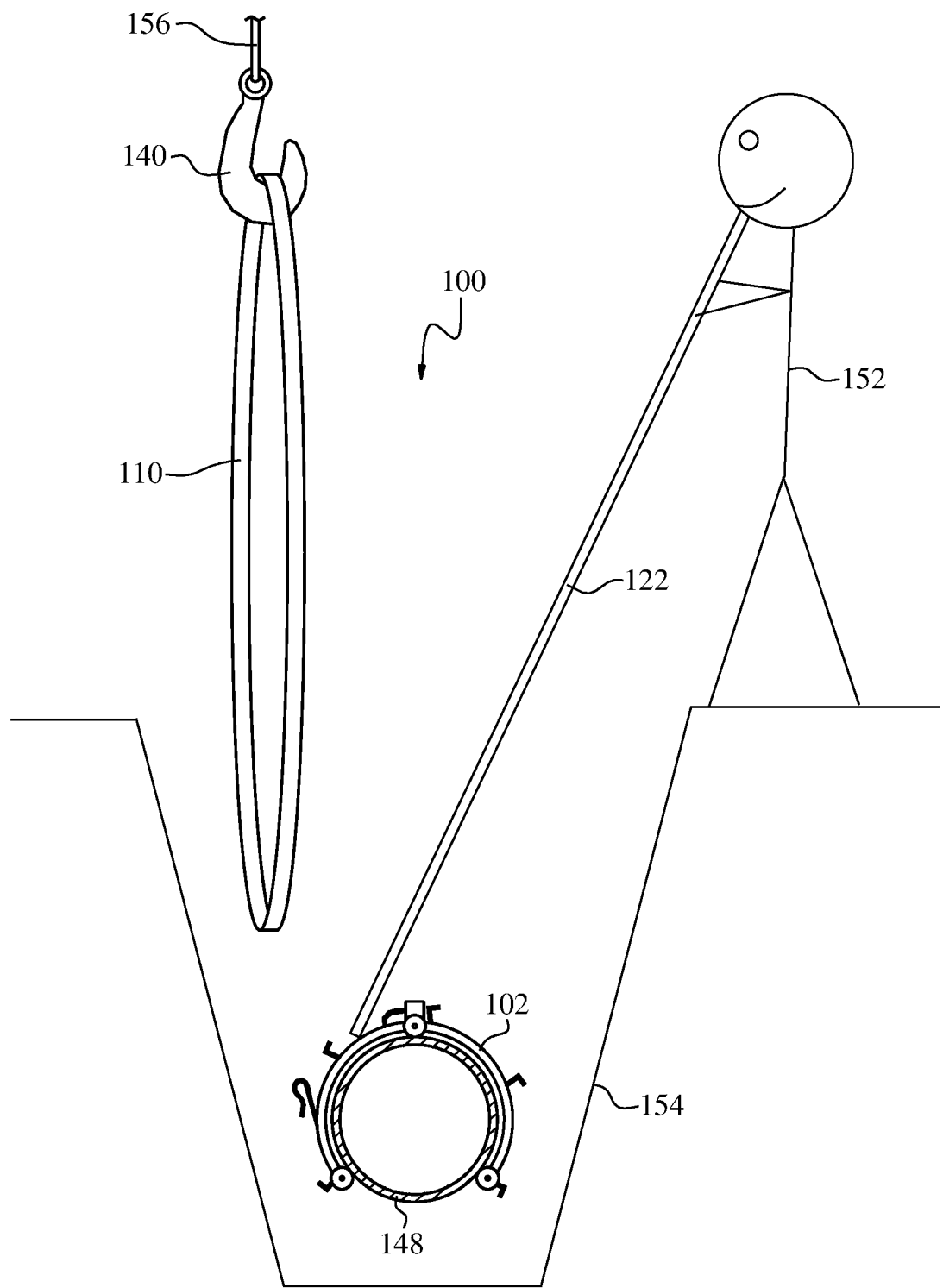
FIG. 19 is an end view of the embodiment in FIG. 4 being placed in use in a trench.

FIG. 19 illustrates a user 152 operating rod 122 from a remote location above grade of pipe 148 to manipulate the strap-installing device 100 for installation on, and rotation about, pipe 148. The pipe 148 is disposed in trench 154, and body 102 has clearance to circumnavigate the pipe 148. Using the wrapping device 100 and rod 122, hoisting strap 110 may be safely passed around the pipe 110 without requiring the user to enter the trench 154.

Alternative hoisting arrangements are also within contemplation. For example, and with reference to FIG. 19, crane hook 140 can alternatively be guided circumferentially around pipe 148 by the wrapping device 100, and hook 140 could then snatch cable 156 to cinch a hoisting or lifting loop of cable 156 onto pipe 148.

Embodiments may be used in a method for wrapping a hoisting strap 110 around a pipe 148. One such method includes the steps of: providing an apparatus 100; coupling an installation device 120 to the body 102; using the installation device 120 to displace the body 102 transversely toward the centerline 146 of the pipe 148 at a location spaced apart from either end of the pipe until the body 102 is seated in installed registration on the pipe 148; lowering a loop of hoisting strap 110 to locate a loop portion 142 of the hoisting strap in registration with a connector 108 that is carried by the body 102; applying tension to the hoisting strap 110 to couple the loop portion 142 with the connector 108; removing the installation device 120 from the body 102; using the installation device 120 to push or pull on rotation or torque anchors 126 carried by the body 102 and thereby to apply a rotation displacement to the body 102 operably to wrap part of the hoisting strap 110 around the pipe 148; using the installation device 120 to extract the loop portion 142 from the connector 108 such that the hoisting strap 110 extends downwardly on one side of the pipe 148, under the pipe 148, and upwardly on the other side of the pipe 148; coupling the installation device 120 to the body 102; and using the installation device 120 to pull the body 102 transversely from engagement with the pipe 148.

While the invention has been described in particular with reference to certain illustrated embodiments, such is not intended to limit the scope of the invention. The present invention may be embodied in other specific forms without departing from its spirit or essential characteristics. The described embodiments are to be considered as illustrative and not restrictive. The scope of the invention may, therefore, be indicated by the appended claims rather than by the foregoing description. All changes which come within the meaning and range of equivalency of the claims are to be embraced within their scope.

What is claimed is:

1. An apparatus, comprising:
a body structured for transverse installation, in a radially inward direction with respect to a pipe centerline, onto an exterior surface of an exposed subsurface pipe, to an installed position in registration with the pipe at a location spaced apart from either end of the subsurface pipe, wherein at the installed position, the body is capable of rotation about the subsurface pipe centerline;
an installation device having a length sufficient to permit a user to manipulate the apparatus while the user is standing erect with the user's feet at an elevated surface position with respect to the subsurface pipe and being structured to removably couple with the body, cooperating coupling structure carried by each of the body and the installation device being configured and arranged in harmony to permit the user to orient the body in space with respect to the subsurface pipe and to displace the body in the radially inward direction to the installed position; and
a strap connector carried by the body and operable to couple with an end loop portion of a hoisting strap, the strap connector being operable to drag the end loop portion in a circumferential strap installation direction in correspondence with displacement of the body in a circumferential direction around a portion of the subsurface pipe, the strap connector being configured to develop a bias to resist undesired escape of the end loop portion from a holding pen if the end loop portion is displaced in an exit direction.

2. The apparatus according to claim 1, wherein:
at the installed position, the body is coupled to the pipe to resist radial displacement between the body and the pipe while permitting circumferential relative motion between the pipe and the body.

3. The apparatus according to claim 1, further comprising:
an elongate rotator device structured to couple with the body to impart rotation of the body around the pipe centerline.

4. The apparatus according to claim 3, wherein:
the installation device is structured to also function as the rotator device.

5. The apparatus according to claim 3, wherein:
the rotator device has a length sufficient to permit operation by the user standing at an elevated position with respect to the pipe, and further comprising:
a plurality of torque receiving structures carried by the body, each such torque receiving structure providing at least one interface against which the rotator device may engage to impart rotation to the body about the pipe centerline.

6. The apparatus according to claim 5, wherein:
an interface of one of the torque receiving structures is configured in harmony with the rotator device to receive a force imparted by placing the rotator device in compression.

7. The apparatus according to claim 5, wherein:
an interface of one of the torque receiving structures is configured in harmony with the rotator device to receive a force imparted by placing the rotator device in tension.

8. The apparatus according to claim 1, further comprising:
a removal device structured to engage with an extraction structure comprising a loop bracket carried by the body, the removal device then being operable to pull the body in a radially outward direction to remove the body from the pipe;
the removal device further comprising a hook disposed at a distal end of an elongate shaft, the hook and the loop bracket being configured in harmony such that the removal device may be used as a lever to help pry the body from engagement on the pipe, the hook being configured to also couple with the end loop portion to permit the user to lift the hoisting strap.

9. The apparatus according to claim 8, wherein:
the installation device is structured to also function as the removal device.

10. The apparatus according to claim 1, further comprising:
a plurality of rolling elements carried by the body, wherein:
the body is biased by transverse installation of the body onto the pipe to automatically clamp said rolling elements radially onto the external surface of the pipe subsequent to the installation, wherein clamping force to engage each of said rolling elements in contact with the pipe is caused by the bias in the body that is generated by the act of transversely installing the body onto the pipe.

11. The apparatus according to claim 1, wherein:
the body forms a substantial C-shape; and
the C-shape carries a first wheel disposed at one end of the C-shape, and a second wheel disposed at the other end of the C-shape.

12. The apparatus according to claim 11, wherein:
the body carries a third wheel disposed between the first and second wheels, the first, second, and third wheels being all automatically biased by the body into contact with the pipe when the body in installed in registration on the pipe.

13. The apparatus according to claim 11, wherein:
a closest distance between the first wheel and the second wheel, at both of an uninstalled configuration and an installed configuration, is less than the diameter of the pipe on which the apparatus is intended to be installed.

14. The apparatus according to claim 11, wherein:
the first and second wheels are arranged such that, during installation of the body onto the pipe, the first and second wheels engage spaced-apart portions of the pipe such that further transverse displacement of the body in the radially inward direction with respect to the centerline of the pipe pries open the C-shaped body to accommodate travel of the pipe through an expanded opening in the C-shape.

15. The apparatus according to claim 1, wherein:
the body is structured to permit the user to make a change in body size to fit the body in installed registration on different pipes having a plurality of different diameters.

16. The apparatus according to claim 1, wherein:
the strap connector comprises a capture mouth, a constriction, and the holding pen, the capture mouth comprising an enlarged distally directed flared opening extending from the constriction and structured to facilitate engaging with the end loop portion of the hoisting strap, the constriction forming a restriction sized to resist entrance and exit of the end loop portion to and from the holding pen.

17. The apparatus according to claim 16, wherein:
the strap connector is structured in harmony with the end loop portion such that a bias must be developed in the strap connector to permit an increase in size of the constriction during installation of the end loop portion into the holding pen, the bias in the strap connector to resist re-opening the constriction to resist undesired escape of the end loop portion from the holding pen.

18. The apparatus according to claim 17, wherein:
the strap connector is structured such that tension applied to the hoisting strap to displace the end loop portion in an entrance direction to the holding pen is operable to overcome the bias in the strap connector and open the constriction sufficiently to permit entrance of the end loop portion through the constriction and into the holding pen.

19. The apparatus according to claim 17, wherein:
the strap connector is structured such that tension applied to the hoisting strap in an exit direction is operable to overcome the bias in the strap connector and open the constriction sufficiently to permit release of the end loop portion through the constriction and from the holding pen.

20. An apparatus, comprising:
a body extending between a first wall end carrying a first wheel and a second wall end carrying a second wheel, a third wheel carried by the body for rolling contact with a pipe that may be disposed inside a volume defined inside the body, the first wall end being spaced-apart from the second wall end to form an entrance opening to the volume, the entrance opening comprising a first size that prevents entrance of the pipe to the volume, the body being structured for transverse installation, in a radially inward direction with respect to a pipe centerline, onto an exterior surface of an exposed subsurface pipe, to an installed position in registration with the subsurface pipe at a location spaced apart from either end of the subsurface pipe, wherein at the installed position, the body is capable of rotation in a circumferential direction of the subsurface pipe with the first wheel, second wheel, and third wheel being in rolling contact with the exterior surface;
an installation and removal device comprising an elongate shaft with a length between a proximal shaft end and a distal shaft end, the length being sufficient to permit a user to manipulate the body while the user is standing erect with the user's feet at an elevated surface position with respect to the subsurface pipe, said distal end being configured to removably couple with the body to permit the user to orient the body in space with respect to the pipe, to displace the body in the radially inward direction to the installed position, and to permit the user to displace the body in a radially outward direction for retrieval of the body;
a hook disposed proximal to the distal shaft end, the hook being configured to couple with an end loop portion of a hoisting strap to permit the user to lift the hoisting strap;
a strap connector carried by the body to couple with the end loop portion, the strap connector comprising a capture mouth, a constriction, and a holding pen, the constriction forming a restriction of reduced size compared to a corresponding size of the end loop portion, the capture mouth comprising an enlarged distally directed flared opening structured to facilitate engaging with the end loop portion, the strap connector being configured to drag the end loop portion in a circumferential direction in correspondence with displacement of the body in a circumferential direction around a portion of the subsurface pipe, wherein the strap connector is structured in harmony with the end loop portion such that the end loop portion will open the constriction and develop a holding bias in the strap connector during installation of the end loop portion into the holding pen, the holding bias to resist re-opening the constriction to resist undesired escape of the end loop portion from the holding pen, and the strap connector is also configured such that tension applied to the hoisting strap in an exit direction is operable to overcome the holding bias to open the throat sufficiently to permit release of the end loop portion from the holding pen; and
a plurality of torque receiving structures carried in circumferentially spaced-apart relation around an exterior surface of the body, each such torque receiving structure projecting as an upstanding element from the body to provide an interface against which coupling structure carried at said distal shaft end of said installation and removal device may engage to impart rotation to the body about the subsurface pipe centerline; wherein:
the first wheel and the second wheel are arranged such that, during installation of the body onto the subsurface pipe, the first wheel and the second wheel engage spaced-apart portions of the exterior surface such that further transverse displacement of the body in the radially inward direction causes a clamping bias in the body and expands the entrance opening to accommodate travel of the subsurface pipe through an expanded entrance opening, the clamping bias automatically placing the first wheel, second wheel, and third wheel of an installed body into contact with the exterior surface.

* * * * *